United States Patent
Yamada

(10) Patent No.: US 6,351,657 B2
(45) Date of Patent: *Feb. 26, 2002

(54) INFORMATION INPUT DEVICE, CURSOR MOVING DEVICE AND PORTABLE TELEPHONE

(75) Inventor: Akihiro Yamada, Saitama (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,622

(22) Filed: Nov. 19, 1997

(30) Foreign Application Priority Data

Nov. 29, 1996 (JP) .............................. 8-319251

(51) Int. Cl.⁷ ................................. H04B 1/38
(52) U.S. Cl. .................. 455/566; 345/169; 345/157; 455/575; 455/550; 455/90
(58) Field of Search ................. 455/566, 550, 455/575, 462, 564, 556, 90; 345/146, 16, 163, 171, 157, 191; 707/540; 435/564; 379/93.23; D14/142, 144

(56) References Cited

U.S. PATENT DOCUMENTS

| | | | | |
|---|---|---|---|---|
| 4,872,196 A | * | 10/1989 | Royer et al. ................. | 455/564 |
| 4,878,051 A | * | 10/1989 | Andros et al. .......... | 340/825.44 |
| 5,436,954 A | * | 7/1995 | Nishiyama et al. ......... | 455/566 |
| 5,563,631 A | * | 10/1996 | Masunaga .................... | 345/169 |
| 5,617,314 A | * | 4/1997 | Zhong ........................ | 707/540 |
| 5,631,643 A | * | 5/1997 | Hisamori et al. ............. | 341/23 |
| 5,633,912 A | * | 5/1997 | Tsoi ........................... | 455/506 |
| 5,657,378 A | * | 8/1997 | Haddock et al. ......... | 379/93.23 |
| 5,703,947 A | * | 12/1997 | Hino et al. ................. | 379/419 |
| 5,742,838 A | * | 4/1998 | Lim et al. ................... | 707/535 |
| 5,758,295 A | * | 5/1998 | Ahlberg et al. ............. | 455/506 |
| 5,828,313 A | * | 10/1998 | Mochizuki ............. | 340/825.44 |
| 5,956,021 A | * | 9/1999 | Kubota et al. .............. | 345/179 |
| 5,987,336 A | * | 11/1999 | Sudo et al. ................. | 455/566 |

\* cited by examiner

*Primary Examiner*—Dwayne Bost
*Assistant Examiner*—Joy K. Contee
(74) *Attorney, Agent, or Firm*—Jay H. Maioli

(57) ABSTRACT

A compact apparatus, such as a portable telephone set, has first and second rotary dials for selecting information items such as characters to be inputted into a text, or for moving a cursor on a display screen. Each dial is provided with a click mechanism and in accordance with rotational directions and rotational amounts of the dials, a control section of the apparatus selects a desired coordinate location in a table of information items stored in a memory, and enters the information item in the selected location into a buffer memory in response to a clicking operation on the first dial. A further clicking operation on the dial initiates a information conversion mode such as a Japanese kanakanji conversion mode. In this mode, the control section searches a dictionary for one or more information items corresponding to the item in the buffer memory, and displays the corresponding information items one after another on a display screen. The control section enters an item into the text in response to a clicking operation on the second dial.

4 Claims, 11 Drawing Sheets

(OBLIQUE SEARCH IS POSSIBLE)

DIAL 1b

DIAL 1a

[EXAMPLE OF KANA KANJI CONVERSION]

(DIRECT SELECTION)

PUSH (DIRECT SELECTION)

PUSH (DIRECT SELECTION)

森田
モリタ
守田
盛田

PUSH×5

(FIX) PUSH

LEFT SHIFT
(LEFT SHIFT OF CURSOR)

RIGHT SHIFT
(RIGHT SHIFT OF CURSOR)

CLEAR
(DELETION OF ONE CHARACTER
ON THE LEFT OF CURSOR,
AND CORRECTION AFTER
KANA KANJI CONVERSION)

KANA/ENGLISH
(SWITCH BETWEEN KANA INPUT
MODE AND ENGLISH INPUT MODE)

FIG.11A (PRIOR ART)
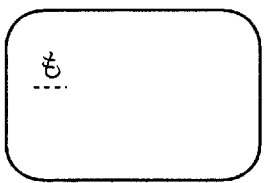
(7マ) (PUSH 5 TIMES) まみむめも も
FIG.11B (PRIOR ART)
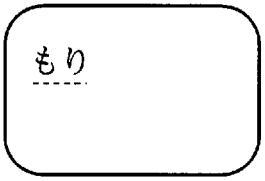
(9ラ) (PUSH 2 TIMES) らり もり
FIG.11C (PRIOR ART)
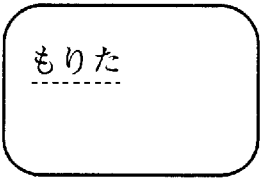
(4タ) (PUSH 1 TIME) た もりた
FIG.11D (PRIOR ART)
森田
(変換) (CONVERSION)
FIG.11E (PRIOR ART)
モリタ
(変換) (CONVERSION)
FIG.11F (PRIOR ART)
守田
(変換) (CONVERSION)
FIG.11G (PRIOR ART)
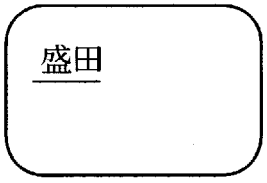
(確定) (FIXATION)

INFORMATION INPUT DEVICE, CURSOR MOVING DEVICE AND PORTABLE TELEPHONE

BACKGROUND OF THE INVENTION

The present invention relates to an information input device, cursor moving device and portable or hand-held telephone apparatus using two devices (such as dials) for selecting information by motion (such as rotation) and fixing information by clicking.

Analog portable telephones, digital portable telephones and PHS (Personal Handy-phone System, in service in Japan) telephones are now gaining popularity as portable communication terminals with the advantage of compactness and light weight. Many portable communication terminals have a function to store frequently used telephone numbers in a memory. In this case, a user enters names of callees and telephone numbers by inputting characters.

In the conventional communication terminals, Japanese katakana characters and letters of the English alphabet are assigned to the keys of a ten-key set for dialing telephone numbers. One method for inputting characters is a key input method in which a desired character is entered by pressing the ten key set. Another method employs a dial and one or more keys for inputting and editing.

In the conventional portable telephone, Japanese kana-kanji conversion (or translation) is performed as shown in FIGS. 10 and 11.

FIG. 10 shows the appearance of a portable telephone set having the function of kana-kanji conversion. As shown in FIG. 10, Japanese katakana characters are assigned to the ten keys. Therefore, a user can input "a reading" (or pronunciation) with the ten keys.

FIGS. 11A~11G illustrates the process of kana-kanji conversion according to the key input method. First, to input a kana character "mo", the 7-numbered key for "ma" row (of ma (ま), mi (み), mu (む), me (め) and mo (も)) is pressed five times, and the display section shows "ma→mi→mu→me→mo" consecutively one after another. In this way, the user can input the kana character "mo(も)" as shown in FIG. 11A. Likewise, the user inputs "ri(リ)", next to "mo(も)", by pressing the 9-numbered key of "ra" row (of ra (ら), ri (リ), ru (る), re (れ) and ro (ろ)) two times (FIG. 11B), and inputs "ta" by pressing the 4-numbered key of ta row (of ta (た), ti(ち), tu(つ), te(て) and to(と)) one time (FIG. 11C). Thus, the user can input the "reading" of "mo-ri-ta(もりた)", as shown in FIG. 11C.

Then, for kana-kanji conversion, the user pushes down a conversion key (henkan key) four times (FIG. 11D~FIG. 11G). Therefore, the display section displays four candidates, "森田→モリタ→守田→盛田", one after another. By pushing down a fixing or decision key ("kakutei" key), the user can fix the fourth candidate, "盛田", as a decided input (FIG. 11G) to a text.

The conventional key input method requires a plurality of key strokes to find a desired kana character, and the conventional method is very awkward. The combination method of one dial and other keys requires a plurality of rotational dial operations to find desired kana characters.

SUMMARY OF THE INVENTION

It is therefore an object of the present invention to provide an information input device for quickly selecting and fixing an information item such as a kana character with two operating devices, a cursor moving device for moving a cursor freely with two operating devices, and a compact telephone apparatus using these devices.

According to the present invention, an information input device comprises first and second selecting means capable of being operated in first and second directions; a fixed memory for storing a plurality of information items in coordinate locations in a manner of one to one correspondence; display means for displaying at least the information in the fixed memory; and control means for selecting a desired coordinate location of the fixed memory in accordance with a physical amount of movement of said first selecting means in the first direction and a physical amount of movement of said second selecting means in the first direction, and fixing the information in the selected coordinate location in accordance with an operation of said first selecting means or said second selecting means in the second direction.

Accordingly, the device selects a desired coordinate location in the fixed memory in accordance with the physical amounts of the first and second selecting means in the first direction, and fixes the information on the coordinates in accordance with the operation of the first or second selecting means in the second direction.

A cursor moving device according to the present invention comprises: first and second cursor moving means capable of being operated in first and second directions; a display section for displaying a plurality of information items; a cursor generating means for displaying a cursor on the display section; and control means for moving said cursor on the display section in accordance with physical amounts of movement of said first and second cursor moving means in the first direction.

Accordingly, the device moves the cursor displayed on the display section in accordance with the physical amounts of movement of the first and second cursor moving means.

BRIEF DESCRIPTION OF THE DRAWINGS

FIGS. 11A~11G are views for illustrating a kana-kanji conversion process with the conventional portable telephone.

DETAILED DESCRIPTION OF THE INVENTION

The following is an explanation of an embodiment of the present invention. In this embodiment, an information input device and a cursor moving device according to the present invention are applied to a portable telephone apparatus. In this example, a first character row which is a Japanese hiragana character or a row of Japanese hiragana characters is inputted as input information, and the input information is converted to a second character row comprising a Japanese kanji or katakana character or a row of kanji or katakana characters. A conversion candidate is one of possible second character rows corresponding to a first character row.

Figure 1:
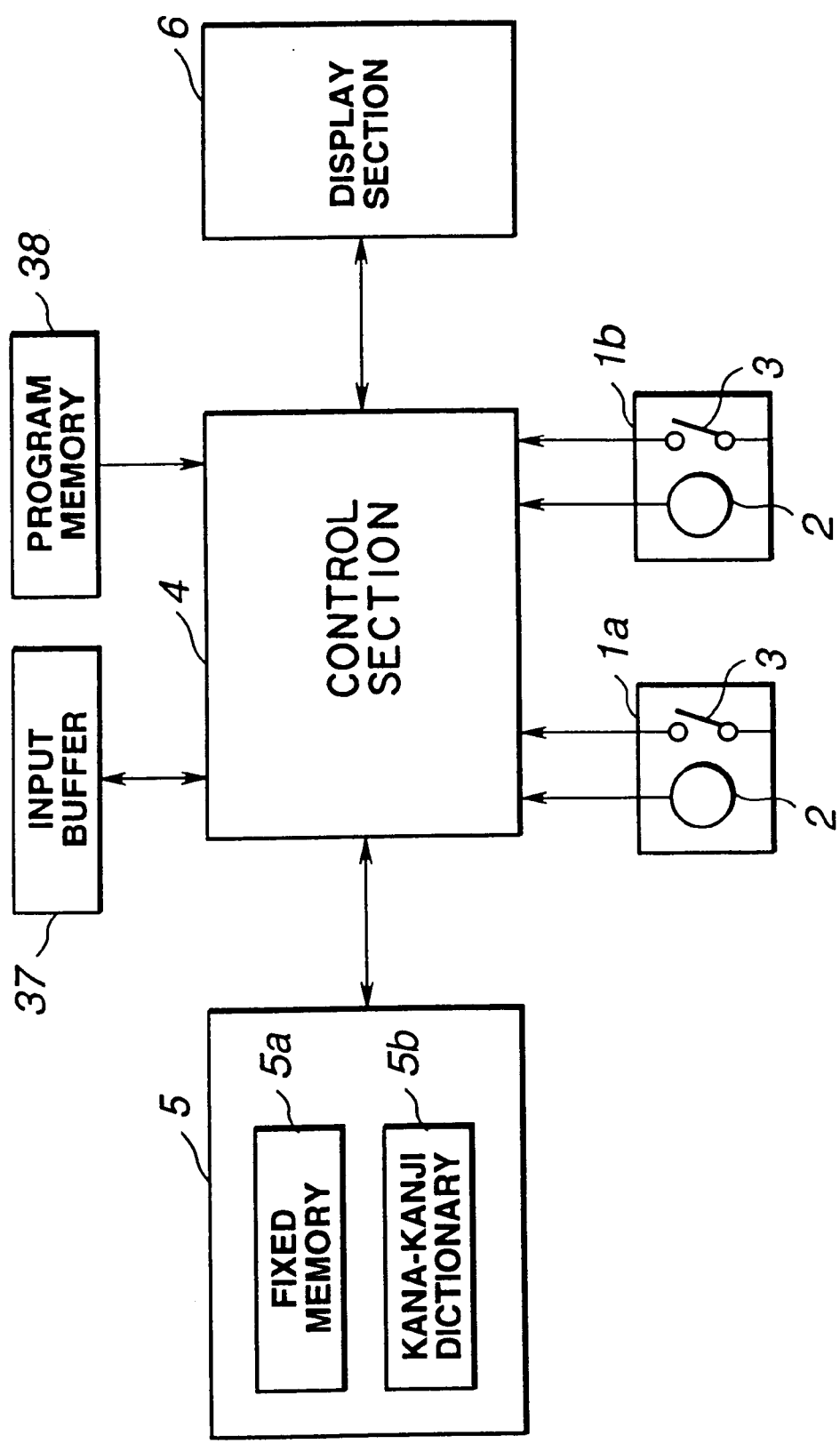
FIG. 1 is a block diagram showing, in a functional manner, the structures of a device serving as an information input device and a cursor moving device according to an embodiment of the present invention.

FIG. 1 shows a device according to one embodiment of the present invention. The device shown in FIG. 1 is an information input device serving also as a cursor moving device. The information input device of FIG. 1 comprises an operating section 1, a control section 4, a memory section 5, a display section 6, an input buffer 37, and a program memory 38.

The memory section 5 of this example comprises a fixed memory 5a and a kana-kanji dictionary 5b. The fixed memory 5a stores a table of first information items (such as a table of characters) in appropriately selected coordinates in a manner of one to one correspondence. For example, the table is a rectangular array of information items. In this example, the table is a table of of Japanese kana characters. As schematically shown, as an example, in FIG. 2A, the table stored in the fixed memory 5a is a table of the Japanese syllabary.

The kana-kanji dictionary 5b of this example includes a read only memory, and stores a collection of second information items. In this example, each second information item is a second character row corresponding to a kana character row selected from the fixed memory 5b.

The input buffer 37 temporarily stores at least one kana character selected from the fixed memory 5a. The program memory 38 stores a program for converting an inputted first information item (such as "an inputted kana character row") into a corresponding second item by searching the kana-kanji dictionary 5b in accordance with the contents of the input buffer 37.

The display section 6 displays kana characters to be inputted, conversion candidates, results of conversion and characters fixed and entered into a text.

Figure 3:
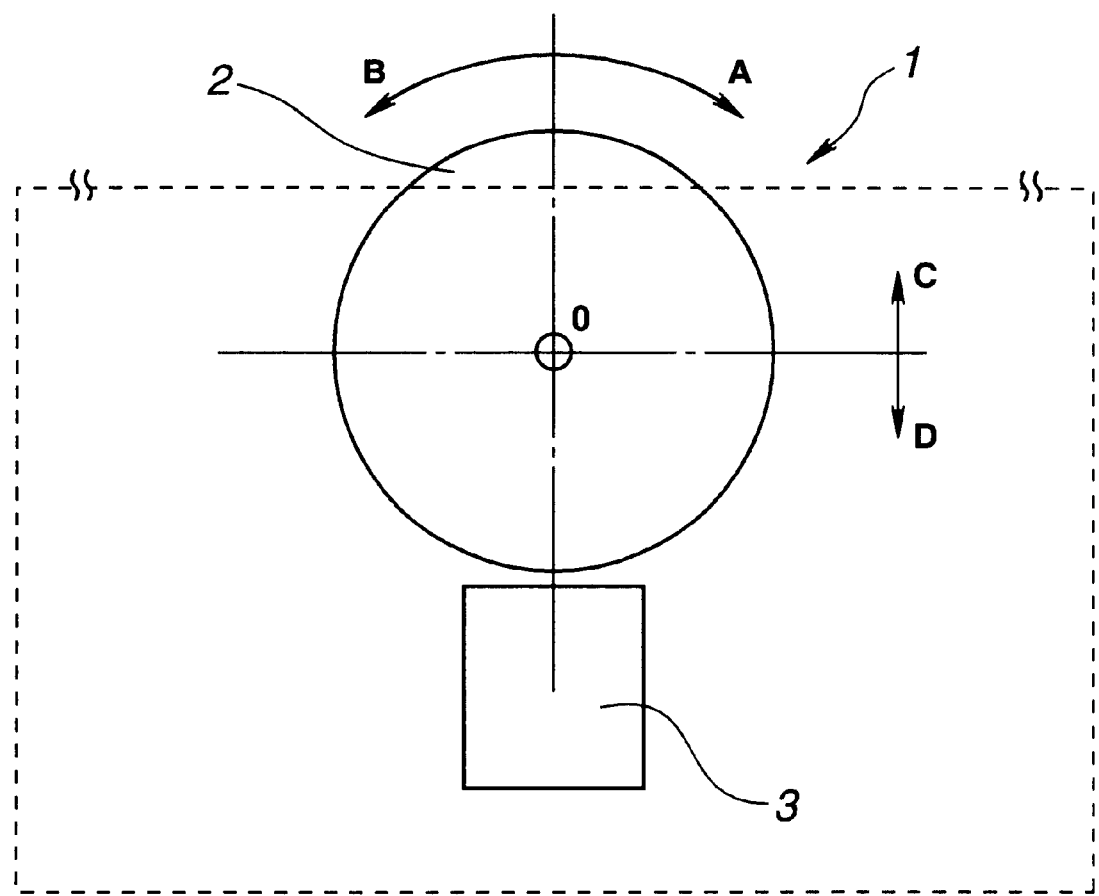
FIG. 3 is a plan view schematically showing a mechanism of one of the dials of the device of FIG. 1.

The operating section 1 is adapted to be operated by a hand or by a finger. The operating section 1 of this device enables the user to select, input and process one or more information items and to move a cursor displayed on a screen of the display section. In this example, the operating section includes dials 1a and 1b which are constructed, for example, as shown in FIG. 3. Each dial 1a or 1b comprises a member 2 of a circular disk shape (constituting a rotary encoder) rotating in a rotational direction (as shown by arrows A and B) around a rotation axis O, a slide plate (not shown) slidable in a radial direction (arrows C and D), and a slide switch 3.

The slide switch 3 of each dial is urged in the C direction together with the slide place, by a biasing portion. The rotation axis O is fixed with the slide plate, so that the rotation axis O is stationary to the slide plate. When the dial 1 is pushed in the direction of the arrow D, the rotary encoder 2 slides as a unit with the slide plate, pushes down the slide switch 3, and thereby turns the switch 3 to the on state. This device determines whether each dial 1a or 1b is clicked or not, by detecting the on signal or the off signal of the associated slide switch 3.

Figure 4:
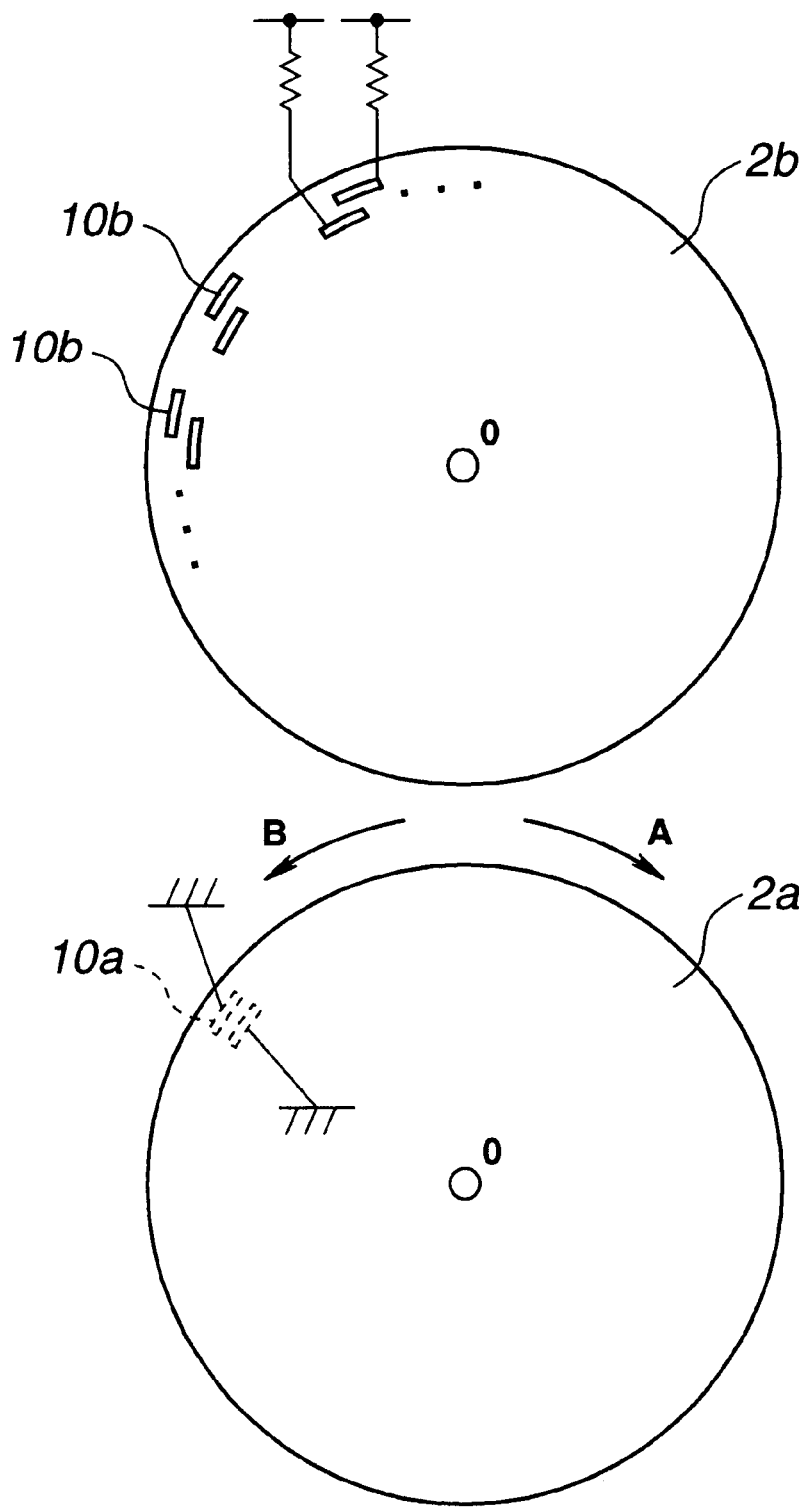
FIG. 4 is a plan view showing a rotary encoder of the device shown in FIG. 1.

The rotary encoder 2 of each dial comprises two circular disks 2a and 2b as shown in FIG. 4. The rotary encoder 2 slides together with the slide plate as a unit. The disk 2a is a movable member placed on an upper surface of the disk 2b. The disk 2a is mounted on the disk 2b fixed to the slide plate so that the disk 2a is rotatable relative to the disk 2b. The rotary disk 2a is provided with a pair of confronting electrodes 10a. The disk 2b of this example is provided with 20 pairs of confronting electrodes 10b arranged along the periphery of the disk 2b. In the assembled state, the electrode pair 10a can be put in contact with the electrode pairs 10b of the disk 2b. The electrodes 10b are formed so that the positions of the inner circumferential side and outer circumferential side are shifted slightly. The contact resistance of the confronting electrodes 10a and the confronting electrodes 10b varies with rotation of the rotary disk 2a. Therefore, this encoder 2 provides an output corresponding to a rotation angle of the disk 10a. Thus, each dial 1a or 1b produces a signal indicative of amount and direction of movement of the movable member.

Figure 5A:
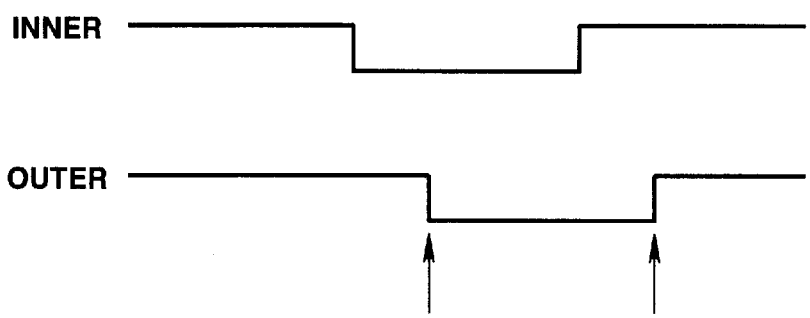
FIGS. 5A and 5B are views showing output waveforms of the rotary encoder.
Figure 5B:
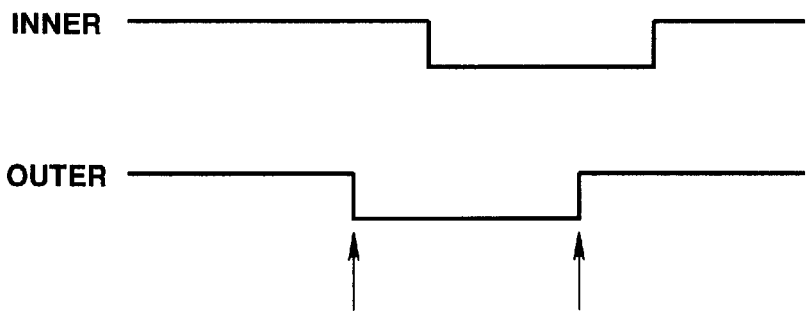

FIGS. 5A and 5B are views showing signal waveforms of an output signal from the rotary encoder 2. FIG. 5A shows the output potentials from the confronting electrodes when the dial is rotated in the A direction. In this case, the potential of the inner side falls first to the ground potential. In the case of rotation in the B direction, as shown in FIG. 5B, the potential of the outer side falls first to the ground potential. Therefore, the device can detect the rotational direction by checking which of the outer side potential and inner side potential falls first. Furthermore, the device can detect the amount of rotation of the dial by counting pulses outputted from the outer side electrode, for example.

Figure 2A:
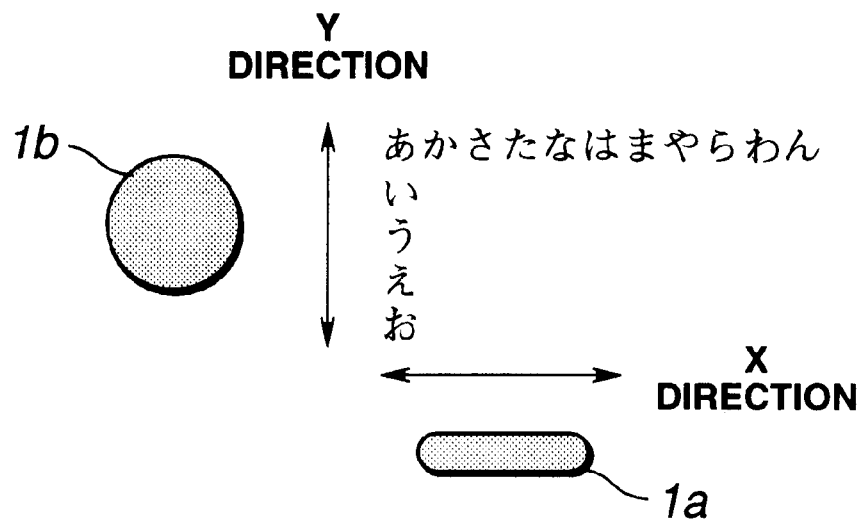
FIG. 2A is a schematic view showing a table of kana characters stored in a fixed memory of the device shown in FIG. 1.
Figure 2B:
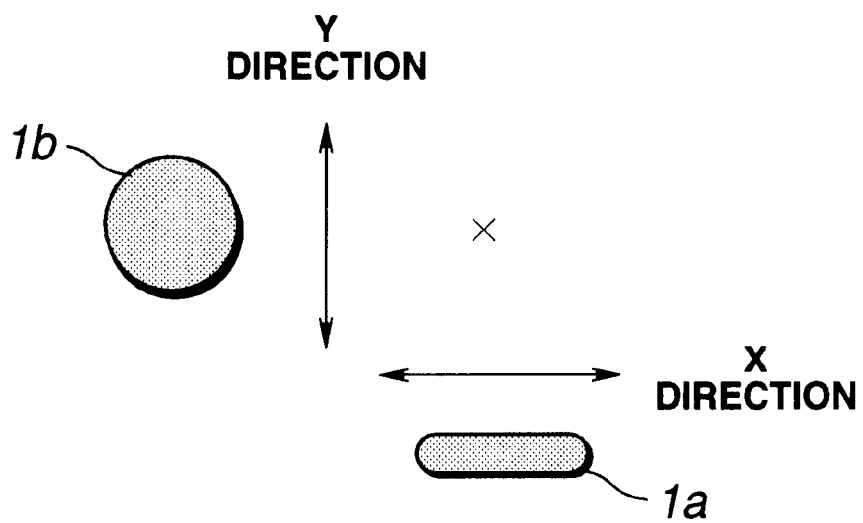
FIG. 2B is a schematic view for illustrating movement of a cursor in a display section with two dials of the device shown in FIG. 1.

The dial 1a of this example produces output pulses from the rotary encoder 2 in accordance with a rotational operation and enables search and selection along the horizontal (X) direction in FIG. 2A with the output pulses, to select a kana character from a horizontally arranged characters. The dial 1a fixes the selected kana character (as a decided input item) and moves the cursor rightwards with the on or off signal of the slide switch 3 in response to a clicking operation. When the kana-kanji conversion is desired, the device is changed to the kana-kanji conversion mode by further clicking on the dial 1a. From a next clicking operation, the display section 6 displays a conversion candidate or conversion candidates one after another.

The dial 1b produces output pulses from the rotary encoder 2 in accordance with a rotational operation, and enables search and selection along the vertical (Y) direction in FIG. 2A. The dial 1b fixes an object displayed on the display section 6, such as a selected kana character row or a converted kanji character row, with the on or off signal of the slide switch 3 in response to a clicking operation.

When the dials 1a and 1b are rotated simultaneously, the user can perform search and selection of characters along an oblique direction in the table of FIG. 2A.

Figure 6:
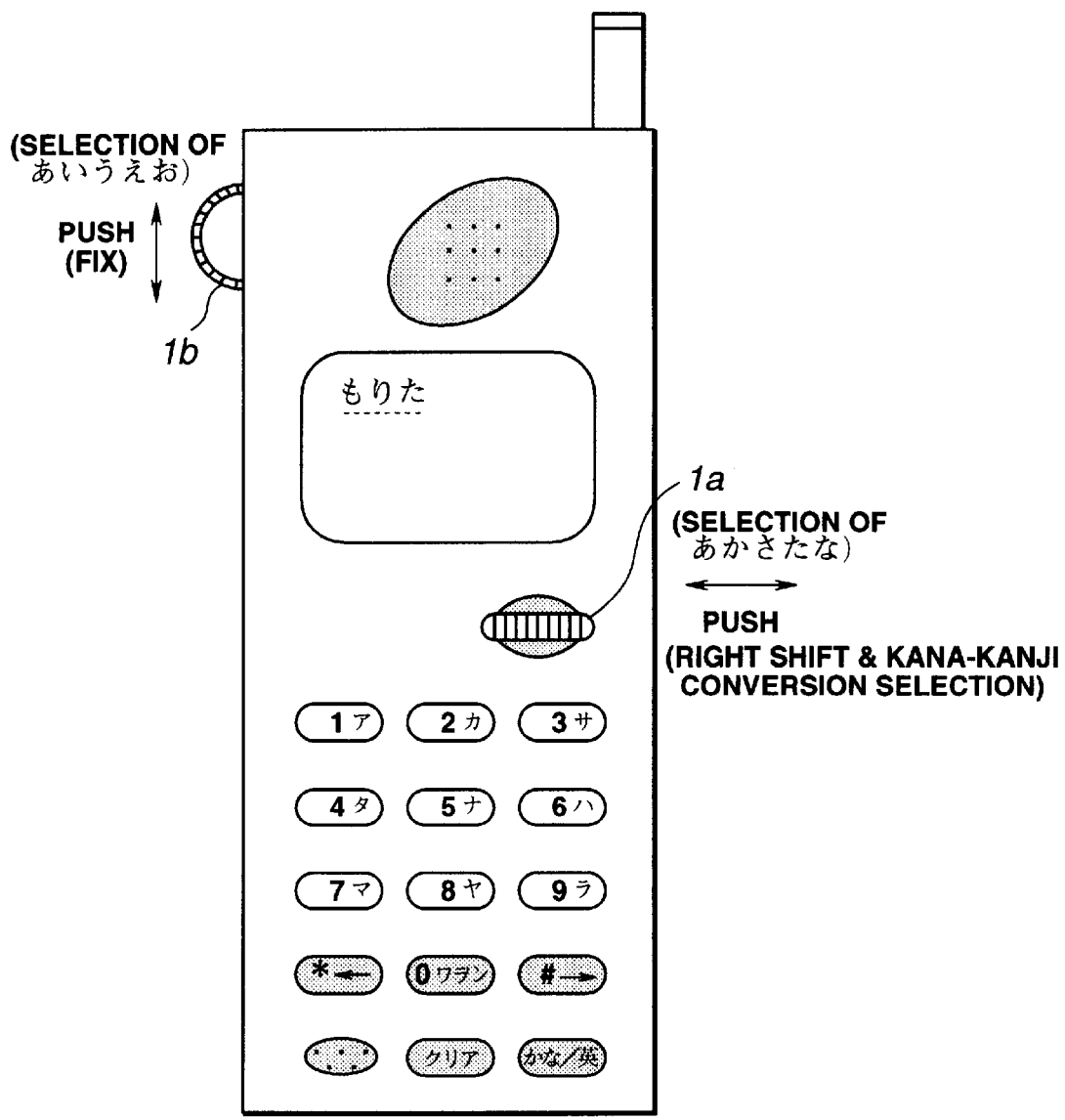
FIG. 6 is a view for showing a text input mode of a portable telephone equipped with the device of FIG. 1.
Figure 7:
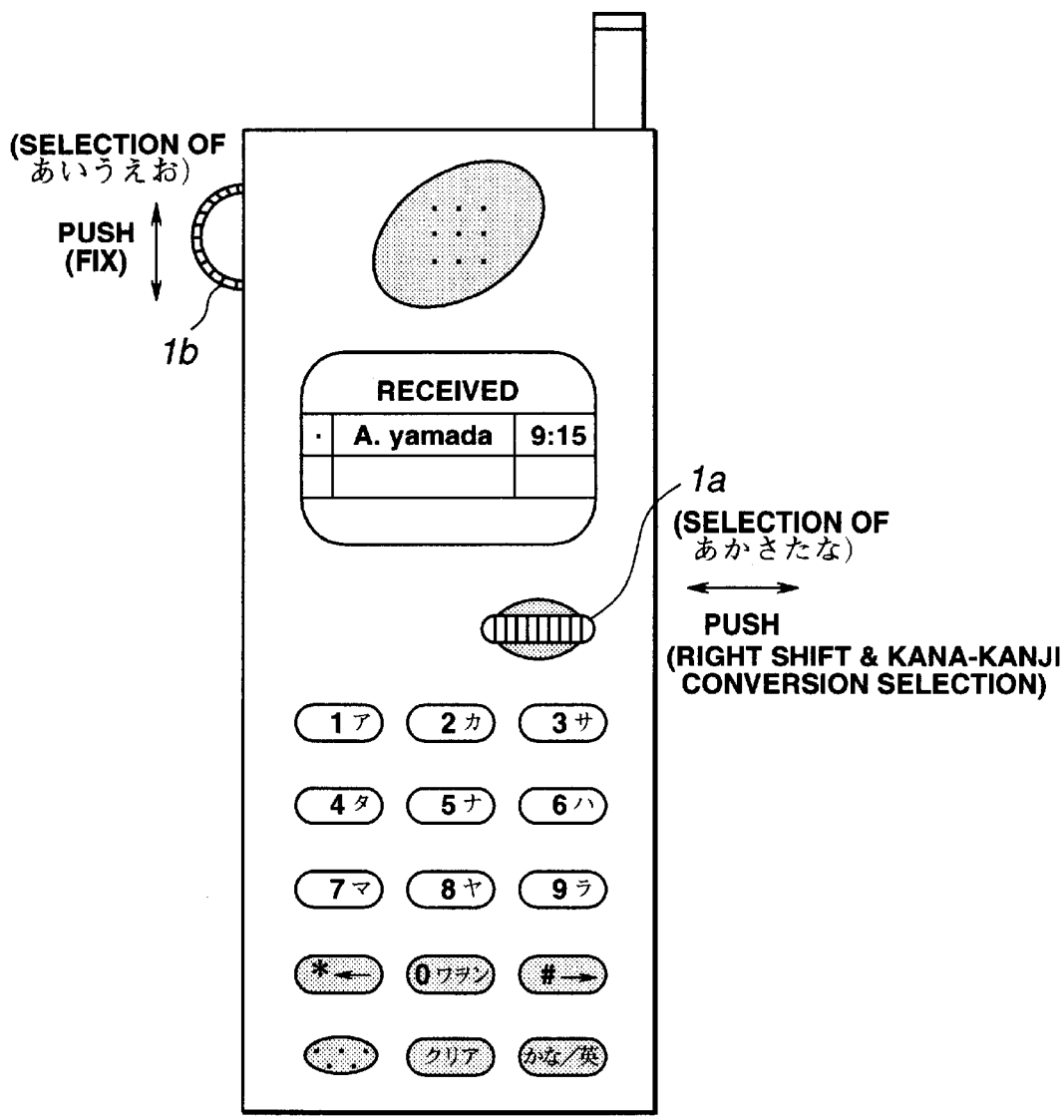
FIG. 7 is a view for showing an E mail mode of the portable telephone.

As shown in an example of FIGS. 6 and 7, the dial 1b is disposed near a receiving section of a compact cordless telephone set. The dial 1a is disposed near the side surface opposite to the side surface in which the dial 1b is provided. In this example, the dial 1b projects from the left side of the telephone set, and the dial 1a projects from the front side near the right side. In this example, the axis of the dial 1b is perpendicular to a plane in which the display screen extends, and the axis of the dial 1a is parallel to the plane. FIG. 6 shows a character input process according to the character input mode (or text input mode). In the example of FIG. 6, kana characters "morita(もりた)" are inputted to obtain kanji "盛田" by conversion. FIG. 7 shows a non-telephone mode (electronic mail mode). In FIG. 7, the screen of the display section 6 displays a received mail book in an open state.

The control section 4 of FIG. 1 is connected with the memory section 5, the display section 6, the two dials (or jog dials) 1a and 1b, the input buffer 37 and the program memory 38. The outputs of the rotary encoder 2 and the slide switch 3 of each of the dials 1a and 1b are supplied to the control section 4. The control section 4 performs various control operations in accordance with these signals.

The following is an explanation about operations of the thus-constructed device. When the rotary encoder 2 of each dial 1a or 1b is rotated, the output pulses corresponding to the amount of rotation are supplied to the control section 4. In accordance with the output pulses, the display section 6 displays kana characters of the fixed memory 5a sequentially one by one under the control of the control section 4. When the dial 1a is clicked, the associated slide switch 3 produces the on signal. This output is supplied to the control section 4, a kana character at the coordinate location is stored into the input buffer 37, and the cursor on the display section 6 is moved rightward. In this way, the user inputs a first character row in the form of a row of hiragana characters representing a reading (or pronunciation) of Japanese language by repeating operations of rotating the dials 1a and 1b and clicking the dial 1a.

After the input of the first character row in the form of the kana character row representing a reading, a further clicking on the dial 1a changes the system to the kana-kanji conversion mode. In the kana-kanji conversion mode, in response to each clicking operation on the dial 1a, a search is performed over kanji conversion candidates (or second information items) stored in the kana-kanji dictionary 5b by using as a retrieval key, the kana character row in the input buffer 37, according to the software stored in the program memory 38. The display section 6 displays conversion candidates corresponding to the inputted kana character row, one after another. When a desired conversion candidate is displayed, the user fixes the conversion candidate as a decided input by clicking on the dial 1b.

In this embodiment, the kana-kanji conversion is carried out by clicking on the dial 1a. Alternatively, it is optional to use rotation of either or both of the dials 1a and 1b. In the case of input of only kana character rows, the system may be arranged to fix a kana character row by clicking on the dial 1b, without entering the kana-kanji conversion mode.

Figure 8A:
FIG. 8A is a view for showing a table of information items (kana characters) and shifting directions of the dials of the device of FIG. 1.
Figure 8B:
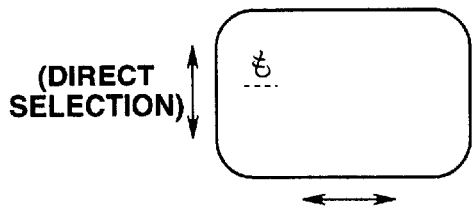
FIGS. 8B~8H are views for illustrating a kana-kanji conversion process of the device of FIG. 1.
Figure 8C:
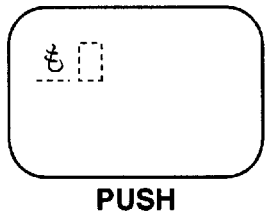
Figure 8D:
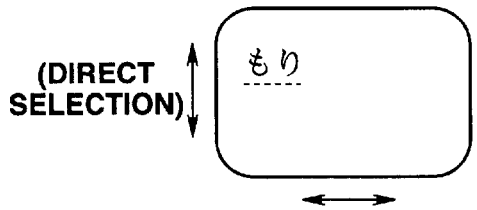
Figure 8E:

FIGS. 8A-8H demonstrates the kana-kanji conversion process using the portable telephone provided with the information input device of FIG. 1. In the example of FIG. 8, the kanji "盛田" is inputted. To input "盛田", the corresponding kana characters mo-ri-ta (もりた) are entered in the following manner. First, the kana character mo (も) is selected by rotating the dials 1a and 1b, as shown in FIG. 8A. After the selection of mo, clicking on the dial 1a causes the selected kana character mo to be fixed as a determined entry, and moves the cursor to the next column.

Figure 8F:
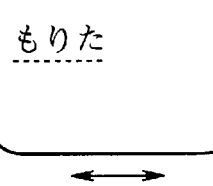

Then, rotation of the dials 1a and 1b enables selection of the kana character ri (り), and clicking of the dial 1a causes fixation of ri. In this way, the kana character row mo-ri-ta is inputted as shown in FIG. 8F by repetition of the operation of selection of a kana character by rotation of the dials 1a and 1b and fixation of the selected character by clicking on the dial 1a.

Figure 8G:
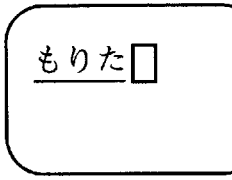
Figure 8H:

After the input of the kana character row of mo-ri-ta, the dial 1a is double-clicked to obtain a conversion candidate display mode. In the conversion candidate display mode initiated by double-clicking, the display section 6 displays conversion candidates corresponding to the inputted kana character row, that is, "森田", "モリタ", "守田" and "盛田", one after another as shown in FIG. 8G in response to a clicking operation on the dial 1a. When the dictionary has learning function, the order of candidates displayed on the screen is updated in accordance with the frequency in use. When the desired "盛田" is reached by clicking of the first dial 1a, the second dial 1b is clicked. Clicking of the second dial 1b fixes the converted character row "盛田", and this character row is inputted into the text.

When the dials 1a and 1b are used as cursor moving devices, the cursor of the display section 6 is moved in accordance with the moving direction and moving amount of each dial 1a or 1b. Furthermore, it is possible to fix or process information at the position of the cursor by clicking on either of the dials 1a and 1b.

Figure 9:
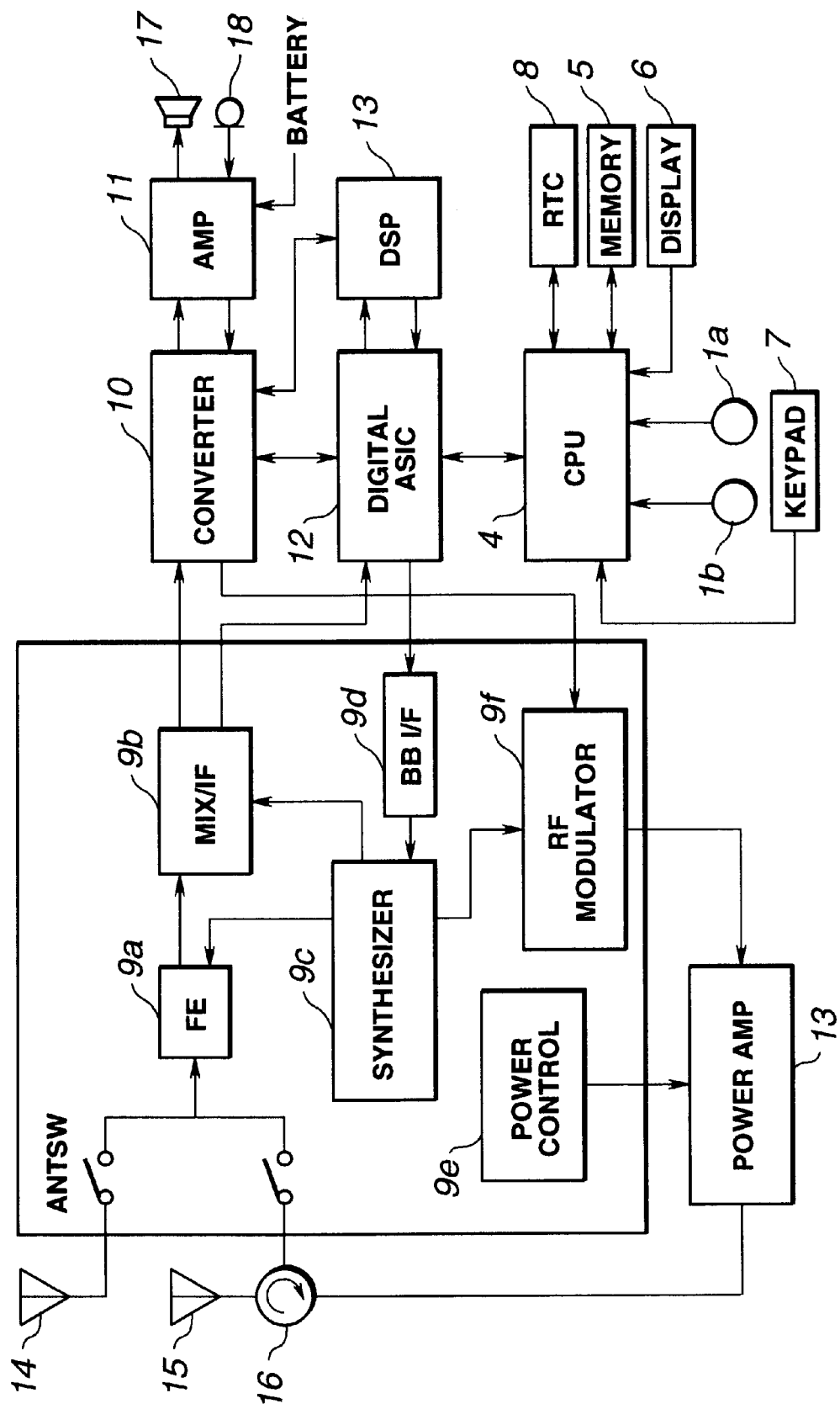
FIG. 9 is a schematic block view of a circuit of a digital portable telephone which can be employed in the telephone according to the present invention.
Figure 10:
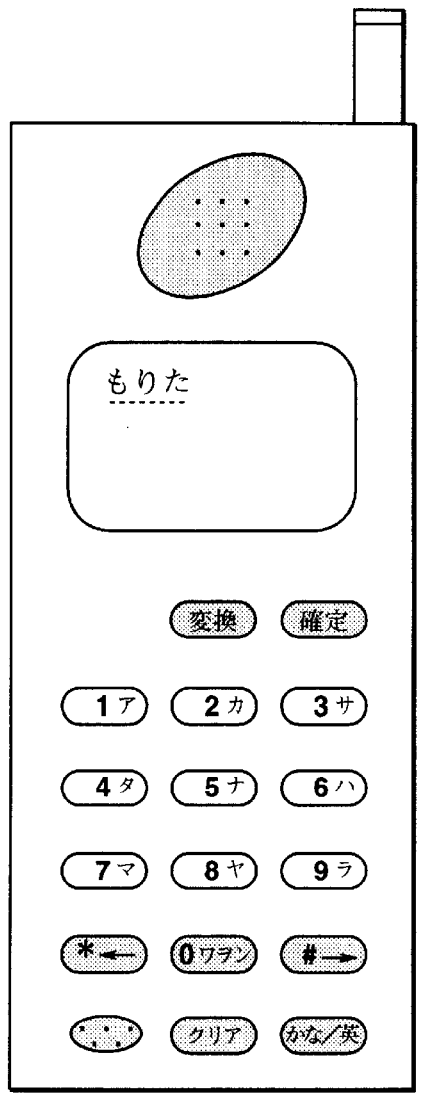
FIG. 10 is a view showing the appearance of a conventional portable telephone.
Figure 10:
Figure 10:
Figure 10:
Figure 10:

FIG. 9 is a schematic block diagram showing a digital portable telephone having the device of FIG. 1. Dial 1a and Dial 1b both function to input data into CPU 4 like Keypad 7. A kana character is specified by judging up and down and forward and reverse with software, and varying an address counter value. The CPU 4 recognizes the slide switch of each of Dial 1a and Dial 1b as one of keys. Therefore, according to circumstances, each slide switch carries out functions of "shift", "kana-kanji conversion" and "decision". RTC 8 functions to display a current time on Display 6.

The following is an explanation about telephone communication by this digital portable telephone.

A voice signal input-ted from MIC 18 is amplified by Amp 11. The amplified voice signal is supplied to Converter 10, and the analog voice signal is converted to a digital form. The digitized voice signal is supplied to DSP (Digital Signal Processor: digital signal processing section) 13. DSP 13 performs a high efficiency coding (data compression) according to a predetermined algorithm, and delivers an output to Digital ASIC 12. Digital ASIC 12 handles channel coding of a layer 1 of a communication protocol, and error correction with hardware, and returns the signal to Converter 10. The signal is converted to the analog form and delivered to RF Modulator 9f. CPU 4 controls a layer 2 of data link of the communication protocol, layer 3 of cordless control, call control and movement control, and various devices.

RF Modulator 9f modulates the high-efficiency-encoded voice signal with the frequency of an output from Synthesizer 9c controlled by a control signal of BBi/f 9d. The modulated voice signal is supplied to Power Amp 13, and amplified under control of Power Control 9e. The amplified voice signal is transmitted through Circulator 16 from Rx/Tx antenna 15. Circulator 16 enables the transmission signal to go only to the route of the Rx/Tx antenna 15 and blocks the route to the receiving side.

This digital portable telephone has a function of space diversity reception with Rx antenna 14 and Rx/Tx antenna 15. Stronger radio waves are selected and supplied to FE 9a. FE 9a amplifies the supplied waves and supplies the waves to MIX/IF 9b. MIX/IF 9b mixes the amplified signal with the signal outputted from Synthesizer 9c to produce an intermediate frequency signal. The intermediate frequency signal is processed by Digital ASIC 12, DSP 13 and Converter 10, and converted to an analog voice signal by detection, error correction, voice decoding and digital/analog conversion. The analog voice signal is amplified by Amp 11, and Speaker 17 makes audible voice of the other party.

As explained above, the portable telephone having the information input and cursor moving device according to the present invention employs the rotary dials equipped with the push mechanism (click mechanism). Therefore, operations are easy, and the advantages are attainable, even in a compact portable telephone with no or little change of design and shape, specifically for input to a telephone directory, and data communication of electronic mails. Direct search (oblique search) makes it possible to find a desired kana character or the like smoothly.

The dials 1a and 1b, when not used for the kana character input and kana-kanji conversion, can be used for scrolling or moving a cursor or pointer on a small LCD (Liquid Crystal Display) screen of the display section of the portable telephone.

In the illustrated example, input information is in the form of kana characters. However, the present invention is applicable to the input of symbols, alphabet or language other than Japanese.

The present invention is not limited to the illustrated embodiment with respect to the method of kana-kanji conversion, the positions, shapes and operation of dials, the number of dials and a combination of a ten-key set and dials.

As explained above, the information input device according to the present invention has two of selecting or operating devices having selecting function and fixing function. Therefore, after selection of target information item, the target information can be fixed as decided entry by clicking on the same device used for the selection. A user can readily select and fix information without need of moving a hand or finger away from the device.

The cursor moving device according to the present invention can move a cursor freely on a display screen of a display section only with two of operating devices. In addition to the above-mentioned effect, the cursor moving device enables fixation of information at the position of a cursor merely by clicking on the operating device used for moving the cursor without need of moving a hand or finger away from the device.

The portable telephone having the information input device according to the present invention makes it possible to operate two selecting or operating devices by the use of only one hand. Therefore, even in an awkward situation, during walking or in a vehicle, for example, a user can fix information, after selection, merely by clicking on the same device used for selection. A user can search and fix information speedily, and readily input the information without moving one's finger from the selecting device.

The portable telephone having the cursor moving device according to the present invention makes it possible to operate two moving devices by the use of only one hand. Therefore, even in an awkward situation, during walking or in a vehicle, for example, a user can move a cursor smoothly. In addition to the above-mentioned effect, the portable telephone of the illustrated embodiment enables fixation of information at the position of a cursor merely by clicking on the device used for moving the cursor without need of moving a finger away from the device.

According to the illustrated embodiment of the present invention, an apparatus such as hand held telephone set, portable data communication terminal, or data processing unit, comprises at least an operating section, a control section and a display section.

The operating section comprises at least a first operating unit, such as a first operating dial, for producing a first operation signal indicative of amount and direction of movement of a first operating member, such as a rotary member, and a second operating unit, such as a second dial, for producing a second operation signal indicative of amount and direction of movement of a second operating (rotary) member.

The control section is a section for shifting a control point in a first direction in response to the first operation signal, and shifting the control point in a second direction in response to the second operation signal. The control section may comprise a CPU as a main component.

The display section is a section for displaying an object in accordance with a location of the control point. The display section may comprise a screen such as a liquid crystal display screen.

The object may be in the form of an information item or a cursor on the screen. The control point may be an indicator for determining a location (or coordinate location) in a table of information items stored in a memory section and for displaying an information item stored in the memory location; and/or an indicator for determining a position of a cursor on the display screen. The control section can change the information items to be displayed on the screen sequentially by shifting the control point, or move the cursor by shifting the control point.

What is claimed is:

1. A portable telephone apparatus, comprising:

a housing;

a receiver;

a transmitter;

memory means for storing a plurality of kana-characters in a matrix table having X and Y axises of coordinates and a plurality of kanji-characters;

first and second information selecting means protruding from a side and a front of said housing, respectively, said first information selecting means being rotatably operated in a first direction and a second direction opposite to the first direction, said second information selecting means being rotatably operated in a third direction and a fourth direction opposite to the third direction, said first and second information selecting means being mounted so as to rotate in directions perpendicular to each other, at least one of said first and second information selecting means operable to be pushed in a direction perpendicular to the axis of its rotating operation;

display means for displaying information for selection by said first and second information selecting means;

control means for causing said memory means to read out a kana-character which is stored at a certain coordinate of the matrix table in said memory means in response to rotational operations of said first and second information selecting means and causing said display means to display the kana-character read out from said memory means, inputting the kana-character displayed on said display in response to the pushed operation of said at least one of said first and second information selecting means, and entering into a kana-kanji conversion mode in response to the pushed operation of one of said first and second information selecting means, causing said display means to display kanji-characters corresponding to the inputted kana-character in a predetermined order in response to sequential pushed operation of one of said first and second information selecting means and inputting the displayed kanji-character in response to the pushed operation of said first and second information selecting means.

2. A portable telephone apparatus as recited in claim 1, wherein said control means causes said display means to display the kana-character for selection in accordance with at least one of a rotational operation in the first direction of said first information selecting means and a rotational operation in the second direction of said first information selecting means.

3. A portable telephone apparatus as recited in claim 1, wherein the memory stores kanji-characters of a character row, and further comprising:

converting means for converting the kana-character displayed on said display means into the kanji-character by communication with said memory.

4. A portable telephone apparatus as recited in claim 1, wherein each of said first and second information selecting means comprises a rotary mechanism including a rotary member for enabling an information selecting operation by rotating in the first and second and third and fourth directions, respectively, and a click mechanism for enabling the pushed operation.

* * * * *